US008875374B2

(12) United States Patent
Vontell et al.

(10) Patent No.: US 8,875,374 B2
(45) Date of Patent: Nov. 4, 2014

(54) METHOD OF INSTALLING A FLEXIBLE COMPONENT IN A U-SHAPED COMPONENT

(71) Applicant: United Technologies Corporation, Hartford, CT (US)

(72) Inventors: John H. Vontell, Manchester, CT (US); Ronald W. Brush, Ringwood, NJ (US)

(73) Assignee: United Technologies Corporation, Hartford, CT (US)

( * ) Notice: Subject to any disclaimer, the term of this patent is extended or adjusted under 35 U.S.C. 154(b) by 43 days.

(21) Appl. No.: 13/633,648

(22) Filed: Oct. 2, 2012

(65) Prior Publication Data

US 2013/0067717 A1 Mar. 21, 2013

Related U.S. Application Data

(62) Division of application No. 12/182,783, filed on Jul. 30, 2008, now abandoned.

(51) Int. Cl.
*B23P 15/00* (2006.01)
*B25B 27/00* (2006.01)
*F04D 29/40* (2006.01)

(52) U.S. Cl.
CPC ............ *F04D 29/40* (2013.01); *B25B 27/0092* (2013.01)
USPC ............................... 29/458; 29/889.2; 81/486

(58) Field of Classification Search
CPC ........ B21D 24/04; B21D 24/06; B21D 24/08; B21D 49/00; B21D 27/04; B21D 27/06; B21D 27/08; B23P 13/00; B23P 13/02; B23P 15/02; B23P 15/04; B23P 19/02; B23P 19/10
USPC ............ 29/458, 739, 270, 278, 281.1, 281.5, 29/464, 466, 467, 889.2, 889.3–889.6; 81/486, 488, 489
See application file for complete search history.

(56) References Cited

U.S. PATENT DOCUMENTS

| | | | | |
|---|---|---|---|---|
| 3,706,121 | A | 12/1972 | Gillespie | |
| 6,108,842 | A | 8/2000 | Severinski et al. | |
| 6,112,403 | A | 9/2000 | Ervin et al. | |
| 6,153,035 | A | 11/2000 | Van Lacken | |
| 6,501,042 | B2 * | 12/2002 | Alte et al. | 219/121.46 |
| 6,643,925 | B1 | 11/2003 | Ormachea et al. | |
| 2003/0230372 | A1 | 12/2003 | Schmidt | |
| 2004/0031556 | A1 * | 2/2004 | Kaneko et al. | 156/185 |
| 2005/0060878 | A1 | 3/2005 | Hasircoglu et al. | |
| 2006/0280600 | A1 | 12/2006 | Euvino, Jr. et al. | |
| 2007/0187381 | A1 | 8/2007 | Vontell, Sr. et al. | |
| 2008/0026142 | A1 | 1/2008 | Vontell et al. | |
| 2008/0041842 | A1 | 2/2008 | Alexander et al. | |
| 2008/0053106 | A1 | 3/2008 | Vontell | |
| 2008/0107413 | A1 | 5/2008 | Moore et al. | |

* cited by examiner

*Primary Examiner* — Christopher Besler
(74) *Attorney, Agent, or Firm* — Kinney & Lange, P.A.

(57) ABSTRACT

An installation method makes use of a tool that includes a block and a plate. The block is configured to align the installation tool with a U-shaped component. The plate extends from the block and is configured to hold a flexible component, such that the flexible component is accurately located within the U-shaped component.

20 Claims, 12 Drawing Sheets

METHOD OF INSTALLING A FLEXIBLE COMPONENT IN A U-SHAPED COMPONENT

CROSS-REFERENCE TO RELATED APPLICATION(S)

This application is a division of application Ser. No. 12/182,783 entitled INSTALLATION TOOL FOR USE WITH U-SHAPED COMPONENT, filed Jul. 30, 2008.

STATEMENT OF GOVERNMENT INTEREST

The U.S. Government has a paid-up license in this invention and the right in limited circumstances to require the patent owner to license others on reasonable terms as provided for by the terms of N00019-02-C-3003 awarded by the U.S. Navy.

BACKGROUND

The present invention relates generally to an installation tool. More specifically, the present invention relates to an installation tool for installing a flexible part into a U-shaped component.

The structural attributes of gas turbine engine components can be critical to engine performance. Sometimes a particular component will embody a structure that makes manufacturing processes, such as adhesive bonding, particularly difficult. For example, commonly assigned U.S. patent application Ser. No. 12/080,051, which is hereby incorporated by reference, discloses an improved architecture for embedded heating elements in a fan inlet shroud fairing with a U-shaped structure. Installing a flexible component into a U-shaped component proved difficult in manufacturing.

SUMMARY

An exemplary embodiment of the present invention is an installation method for use with a U-shaped component. The method includes forming a flexible assembly with a flexible component, attaching the flexible assembly to a plate, coating the flexible component with an adhesive, coupling the plate to a block, positioning the block on top of an open end of a U-shaped component, and sliding the plate into the U-shaped component, wherein the plate guides the flexible component into a position for installation.

DETAILED DESCRIPTION

Figure 1:
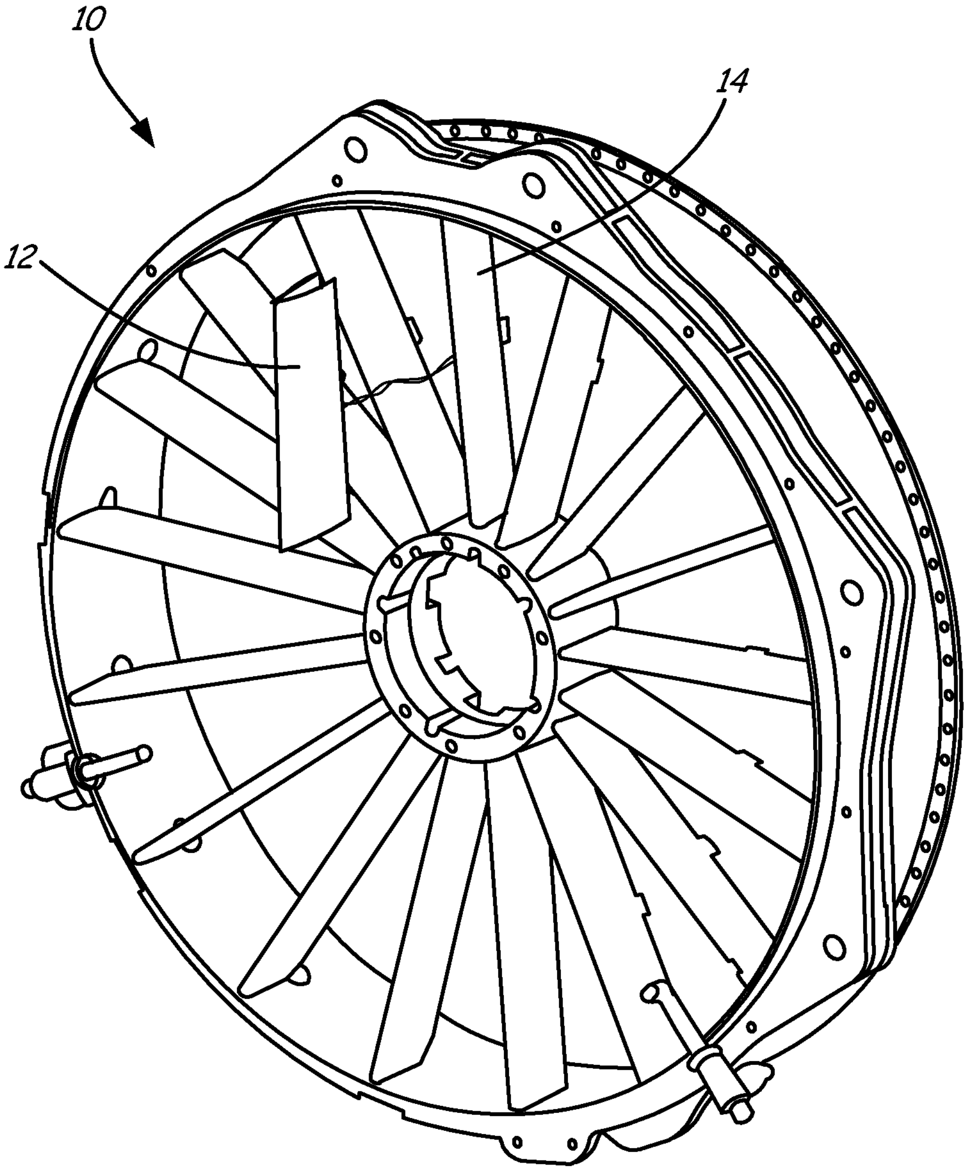
FIG. 1 is a perspective view of a fan inlet case showing the relationship between a fan inlet shroud fairing and a strut ring.

FIG. 1 is a perspective view of fan inlet case 10 showing the relationship between fan inlet shroud fairing 12 and strut 14. A plurality of struts 14 in a spoke configuration generally comprise fan inlet case 10. Fan inlet shroud fairing 12 is a U-shaped component that surrounds the generally planar strut 14. Before attaching fan inlet shroud fairing 12 to strut 14, it may be desirable to adhere a flex circuit to the interior of fan inlet shroud fairing 12.

Figure 2:
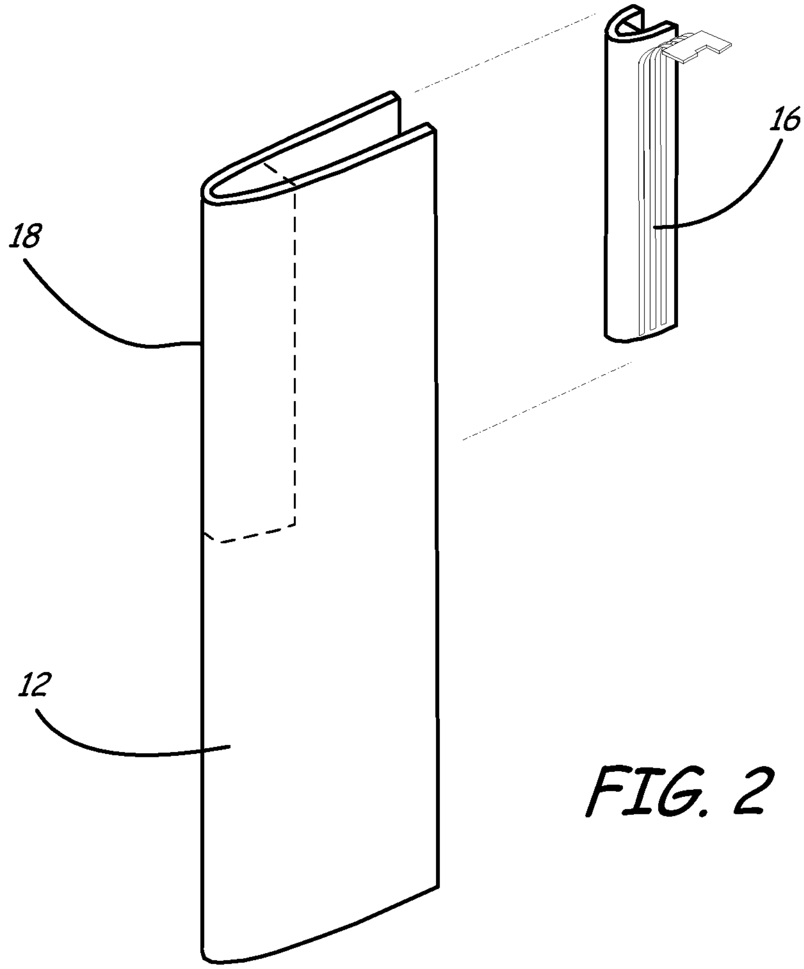
FIG. 2 is an exploded view of a fan inlet shroud fairing and a flex circuit.

FIG. 2 is an exploded view of fan inlet shroud fairing 12 and a flex circuit 16. Flex circuit 16 is generally U-shaped and configured to nestle inside apex 18 of fan inlet shroud fairing 12. In use, flex circuit 16 may nestle within a leading edge (as shown in FIG. 2) or span the entire length of apex 18. Flex circuit 16 must be accurately and reproducibly placed within apex 18 of fan inlet shroud fairing 12 with uniform pressure and without dislodging adhesive from flex circuit 16. Premature contact between flex circuit 16 and fan inlet shroud fairing 12 is detrimental to flex circuit 16 adhesion and a source of contamination for fan inlet shroud fairing 12 and strut 14. An installation tool developed for installing flex circuit 16 into apex 18 of fan inlet shroud fairing 12 is described below.

Figure 3A:
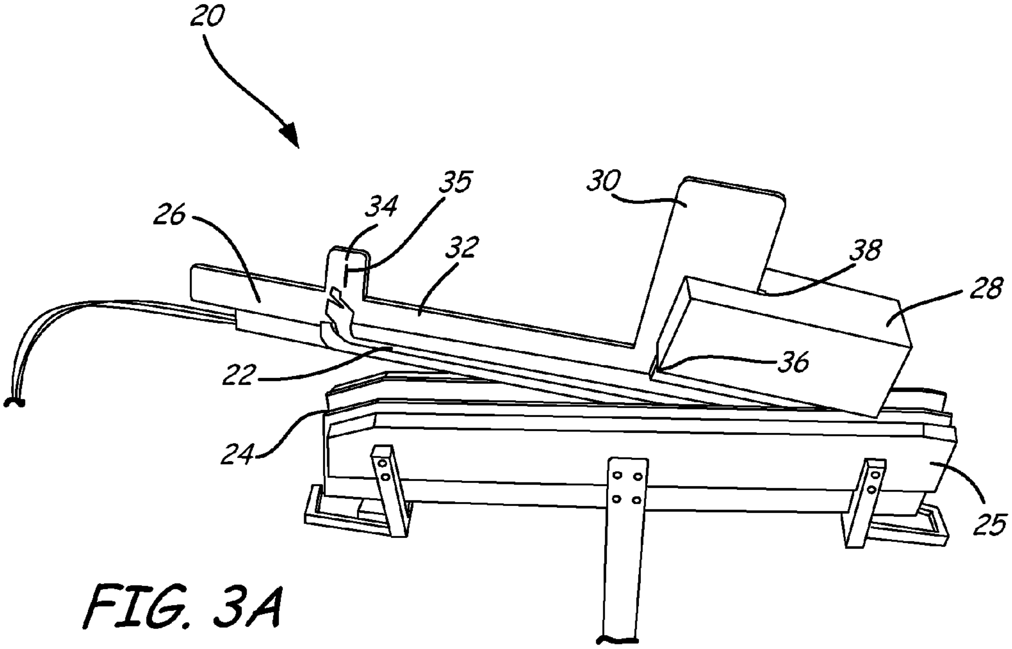
FIG. 3A is a perspective view of a plate coupled to a block installing a flexible component into a U-shaped component.
Figure 3B:
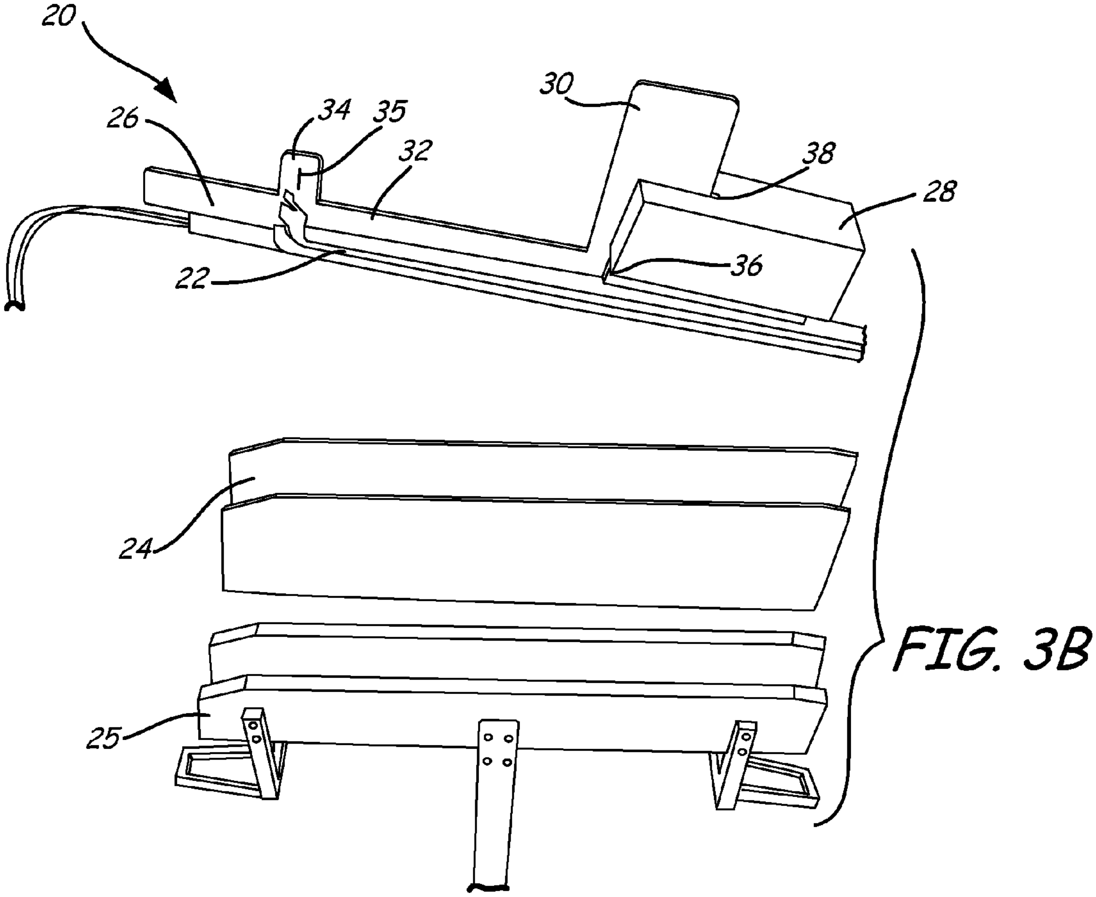
FIG. 3B is an exploded view of FIG. 3A.

FIGS. 3A and 3B show adhesive installation tool 20 for installing flexible component 22 into U-shaped component 24. Flexible component 22 may be a flex circuit (such as flex circuit 16 of FIG. 2) and U-shaped component 24 may be a fan inlet shroud fairing (such as fan inlet shroud fairing 12 of FIG. 2). U-shaped component 24 may rest in cradle 25. Cradle 25 is not necessary for use of installation tool 20, but aids in securely holding U-shaped component 24 while using installation tool 20. Adhesive installation tool 20 includes plate 26 extending from block 28. Plate 26 includes base 30, arm 32, and side arm 34. Arm 32 extends perpendicularly from one end of base 30. Side arm 34 extends perpendicularly from an approximate middle of arm 32 parallel to base 30 and may include indicator 35. Block 28 has lip 36 and slit 38. Lip 36 extends from a surface of block 28 and surrounds approximately rectangular block 28 to form a ridge. Slit 38 runs through an end of block 28.

The length and width of arm 32 are sufficient to support flexible component 22. Side arm 34 is positioned on arm 32 at a predetermined distance to aid in supporting flexible component 22. Side arm 34 may also include indicator 35 to aid in horizontally aligning flexible component 22 with respect to U-shaped component 24. Base 30 is designed to couple with block 28. Preferably, slit 38 receives an edge of base 30 so that plate 26 is removably coupled to and extends from block 28. Lip 36 creates a ridge around block 28, which is configured to align installation tool 20 with U-shaped component 24. The position of lip 36 on block 28 is dependent on the desired vertical alignment of flexible component 22 in U-shaped component 24. Together block 28 and plate 26 form adhesive installation tool 20 capable of installing flexible component 22 into U-shaped component 24.

Figure 4:
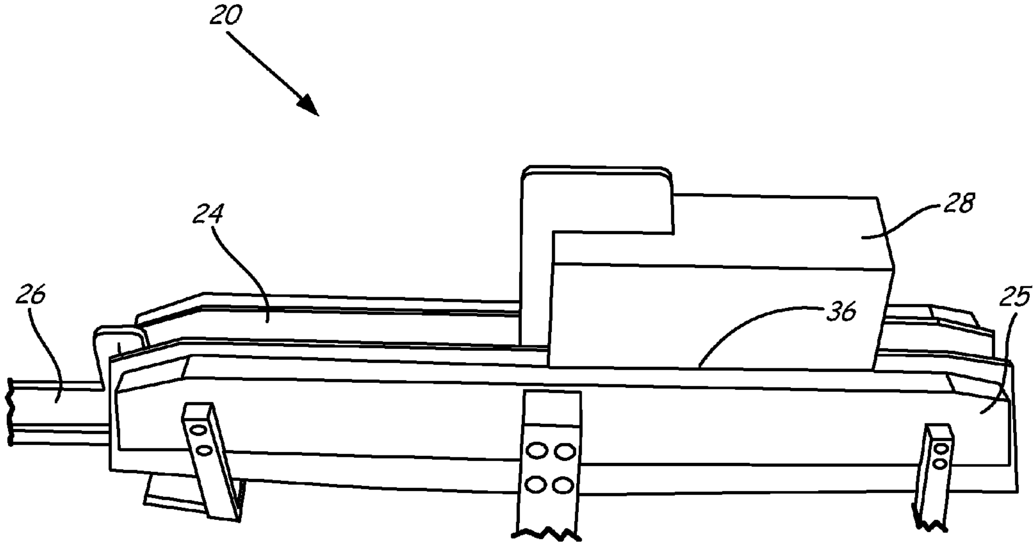
FIG. 4 is a perspective view of a plate coupled to a block, which is resting on top of a U-shaped component.

FIG. 4 is a perspective view of plate 26 coupled to block 28, which is resting on top of U-shaped component 24. Block 28 is surrounded by lip 36. Plate 26 and block 28 are in the same physical relationship described for FIGS. 3A and 3B, which need not be repeated here. FIG. 4 illustrates how lip 36 may rest on top of U-shaped component 24 during installation of a flexible component. When plate 26 is coupled to block 28 and lip 36 is resting on top of U-shaped component 24, plate 26 slides into U-shaped component 24. When plate 26 slides into an open end of U-shaped component 24, it carries flexible component 22 into a predetermined position within U-shaped component 24. After sliding into U-shaped component 24, plate 26 hangs from block 28, which continues to rest on top of U-shaped component 24 via lip 36. Flexible component 22 is thus installed at a particular depth within U-shaped component 24. The position of lip 36 on block 28 determines the vertical alignment of flexible component 22 in U-shaped component 24, which in FIG. 4 is the leading edge of the apex of U-shaped component 24. The combination of plate 26 and block 28 provides for accurate and reproducible positioning of a flexible component within U-shaped component 24.

Figure 5:
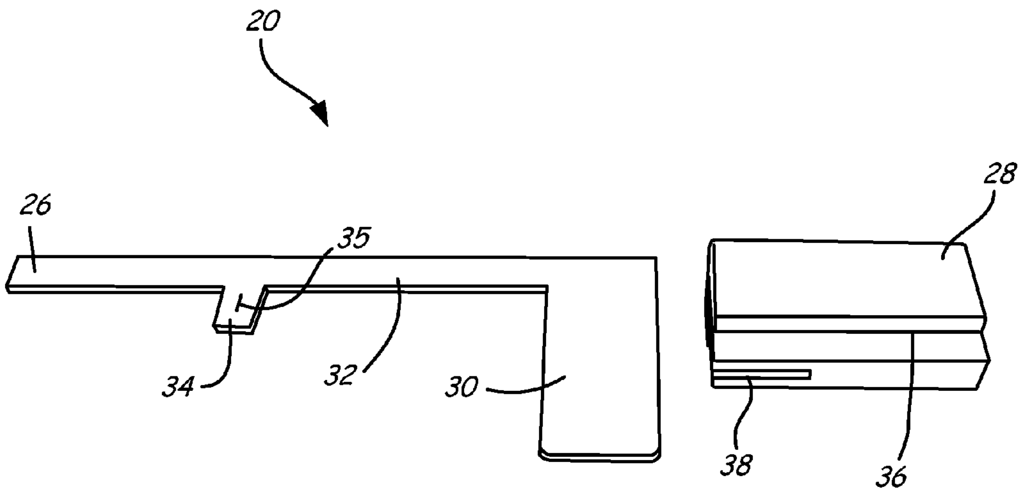
FIG. 5 is a perspective view of a plate decoupled from a block.

FIG. 5 is a perspective view of plate 26 decoupled from block 28. Plate 26 includes base 30, arm 32, and side arm 34 with indicator 35. Arm 32 extends perpendicularly from one end of base 30 so that plate 20 assumes a shape resembling the letter "L". Plate 26 may also assume a double L-shaped configuration wherein two arms extend perpendicularly from a single base in opposite directions. In the embodiment depicted in FIG. 5, base 30 is approximately 2.5 inches (6.35 cm) wide and approximately 6 inches (15.24 cm) long. Arm 32 is approximately 1 inch (2.54 cm) wide and approximately 16 inches (40364 cm) long. Plate 26 is approximately 0.18 inches (0.4572 cm) thick. In another embodiment, plate 26 is approximately 0.25 inches (0.635 cm) thick. Plate 26 may be comprised of metal, such as aluminum. Side arm 34 extends perpendicularly from an approximate middle of arm 32 parallel to base 30 and is configured to support a flexible component. In FIG. 5, side arm 34 is approximately 1 inch (2.54 cm) wide and extends approximately 2.5 inches (6.35 cm) from arm 32 at a distance approximately 9.25 inches (23.495 cm) from base 30. Side arm 34 may include indicator 35 which may simply comprise a line or indentation in the approximate middle of side arm 34. Indicator 35 is configured to aid in the horizontal alignment of a flexible component with respect to a U-shaped component.

Block 28 may be approximately rectangular and comprise any sturdy material that will not damage a U-shaped component such as, but not limited, to nylon. In the embodiment depicted in FIG. 5, block 28 is approximately 3 inches (7.62 cm) tall, 5 inches (12.7 cm) long, and 0.65 inches (1.651 cm) thick. Lip 36 extends from a surface of block 28 and surrounds block 28 to form a ridge. In FIG. 5, lip 36 increased the width of block 28 from 0.65 inches (1.651 cm) to approximately 1.5 inches (3.81 cm). Slit 38 runs through an end of block 28 and is configured for receiving base 30. In FIG. 5, slit 36 runs 2 inches (5.08 cm) long and 0.188 inches (0.4775 cm) wide. Plate 26 and block 28 may be coupled via slit 38 to form installation tool 20 for use with a U-shaped component.

Figure 6:
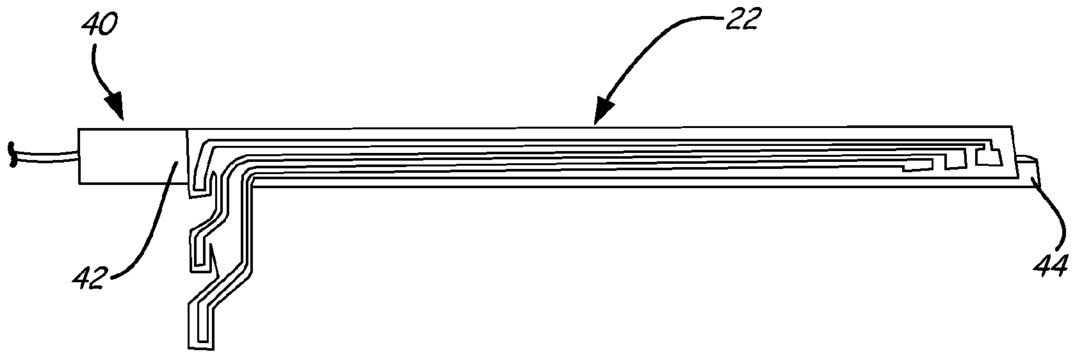
FIG. 6 is a close-up view of a flexible component and an insert.

FIG. 6 is a close-up view of flexible component 22 and insert 40. Flexible component 22 is generally U-shaped and surrounds insert 40. Insert 40 has generally rectangular body 42, which is configured to lie substantially within flexible component 22. Insert 40 also has edge 44, which may protrude slightly from flexible component 22. Flexible component 22 may comprise, but is not limited to, a flex circuit such as flex circuit 16 of FIG. 2. Insert 40 may comprise, but is not limited to, deformable silicone rubber. Insert 40 is inserted into flexible component 22 to form a flexible assembly prior to use of an installation tool. The purpose of insert 40 is to provide uniform pressure while curing an adhesive and to provide rigidity to flexible component 22, which may be necessary for proper installation of flexible component 22 into a U-shaped component. Insert 40 also provides edge 44, which aids in attaching flexible component 22 to a support plate.

Figure 7:
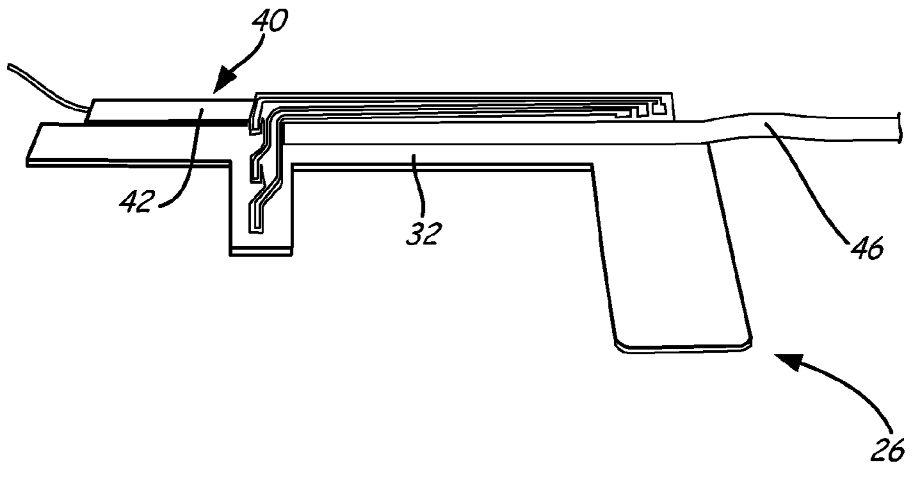
FIG. 7 is a perspective view of a flexible component and an insert attached to a plate.

FIG. 7 is a perspective view of flexible component 22 and insert 40 forming a flexible assembly which is attached to plate 26. After insert 40 is inserted into flexible component 22 to create a flexible assembly, the flexible assembly may be attached to plate 26. Specifically, tape 46 attaches insert 40 to arm 32. Insert 40 may include an edge (such as edge 44 in FIG. 6), which may protrude slightly from flexible component 22 and aid in attaching insert 40 to arm 32. Because insert 40 is substantially within flexible component 22, a flexible assembly is formed and attached to arm 32. Additional tape 46 may be used to cover a majority of plate 26. In covering plate 26, tape 46 protects plate 26 from any coating of flexible component 22 with an adhesive. Once flexible component 22 and insert 40 are attached to plate 26, flexible component 22 may be prepared for insertion into a U-shaped component.

Figure 8A:
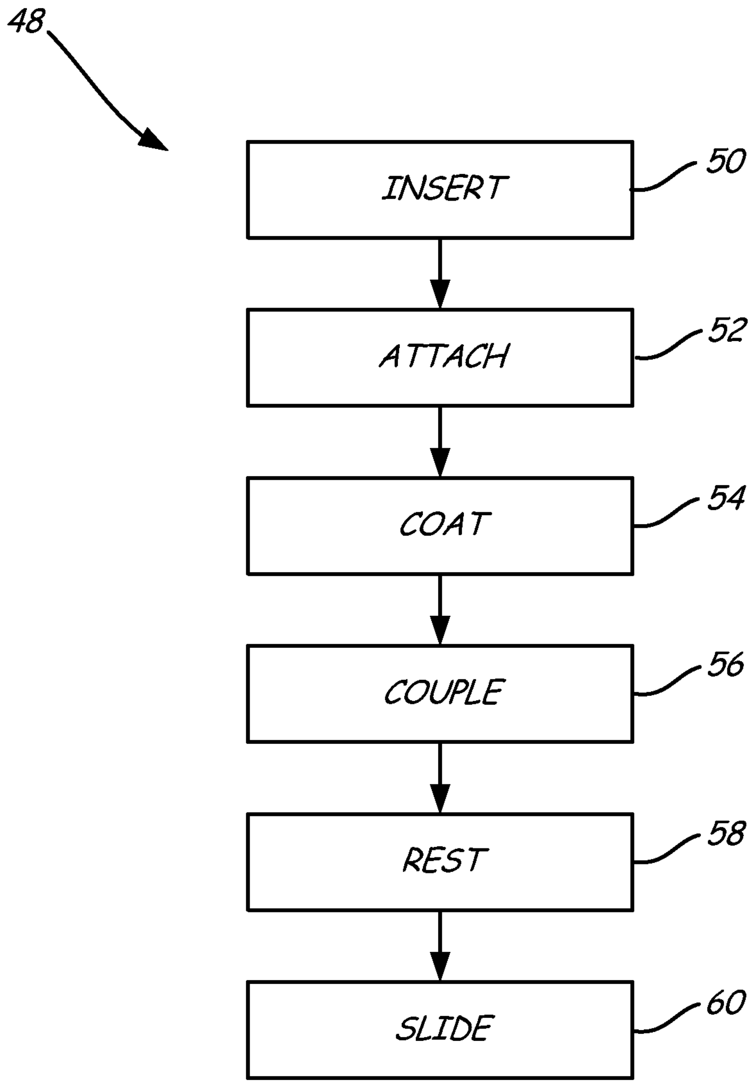
FIG. 8A is a block diagram of a method for using an installation tool.

FIG. 8A is a block diagram of method 48 for using an installation tool to insert a flexible component into a U-shaped component. Method 48 includes: inserting an insert into a flexible component to form a flexible assembly (step 50), attaching the flexible assembly to a plate (step 52), coating the flexible component with an adhesive (step 54), coupling the plate to a block (step 56), resting the block on top of an open end of a U-shaped component (step 58), and sliding the plate into the U-shaped component (step 60). FIGS. 8B-8F illustrate the steps outlined in FIG. 8A.

Figure 8B:
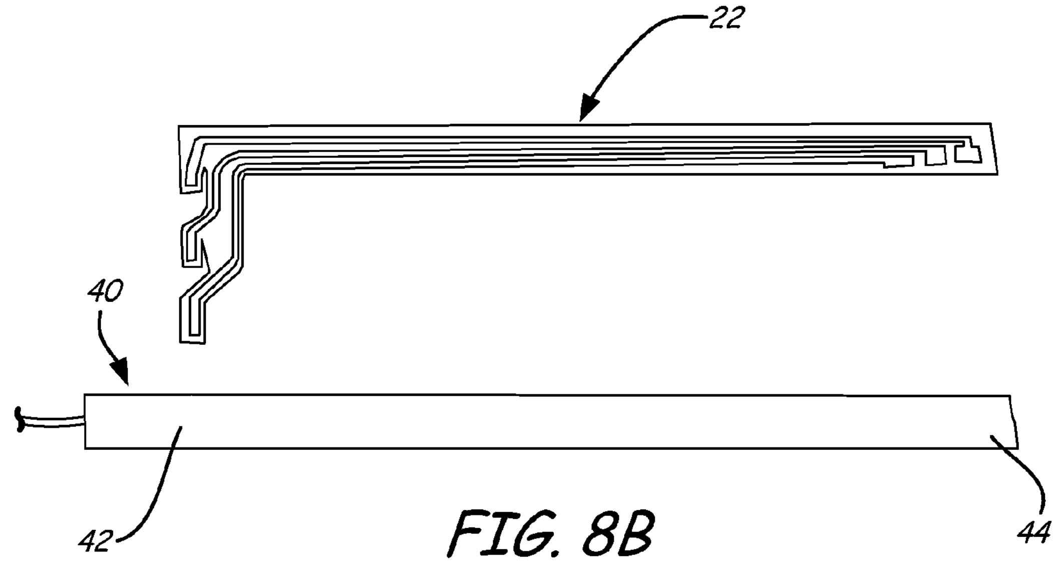
FIG. 8B is a perspective view of an insert being inserted into a flexible component.
Figure 8C:
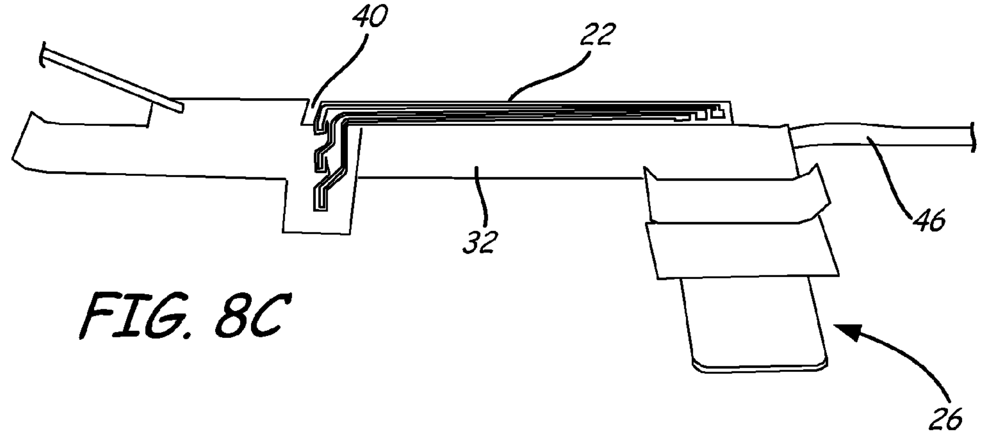
FIG. 8C is a perspective view of an insert attached to a plate.

FIG. 8B is a perspective view of insert 40 being inserted into flexible component 22 (step 50). If insert 40 has body 42 and edge 44, then body 42 should be inserted into flexible component 22 so that edge 44 protrudes slightly. Flexible component 22 may comprise, but is not limited to, a flex circuit. After insertion into flexible component 22, a flexible assembly is created that may be attached to plate 26 (step 52). FIG. 8C is a perspective view of the flexible assembly (flexible component 22 and insert 40) attached to plate 26 (step 52) and masked with tape 46 to prevent adhesive application in undesirable locations. If insert 40 includes edge 44, edge 44 may be used to attach insert 40 to support plate 26 and create flexible assembly. If plate 26 includes arm 32, then insert 40 should be attached to arm 32. Because insert 40 has been inserted into flexible component 22, thereby forming a flexible assembly, flexible component 22 will be attached to plate 26 along with insert 40. Tape 46 may be used to attach insert 40 to support plate 26 and to mask plate from adhesive contamination in undesirable locations such as support plate 26. After attachment, flexible component 22 is coated with an adhesive (step 54) in preparation for insertion into a U-shaped component.

Figure 8D:
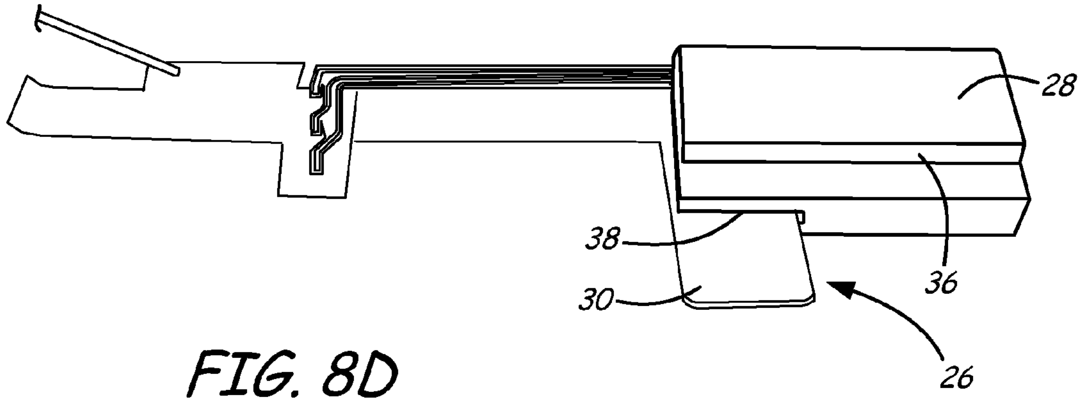
FIG. 8D is a perspective view of a plate coupled to a block.
Figure 8E:
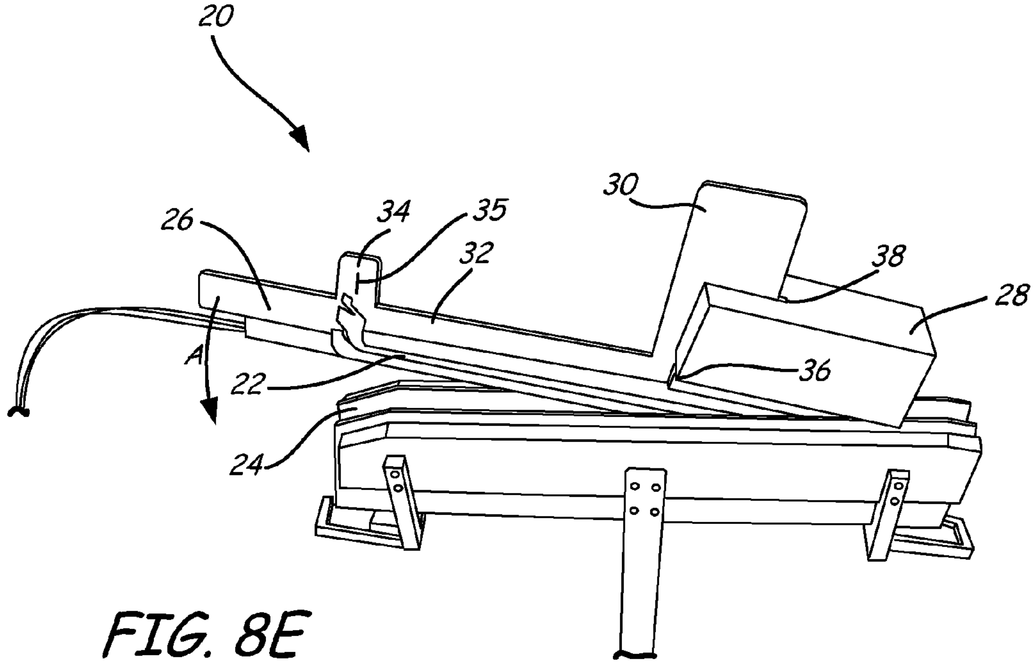
FIG. 8E is a perspective view of a block resting on top of a U-shaped component.
Figure 8F:
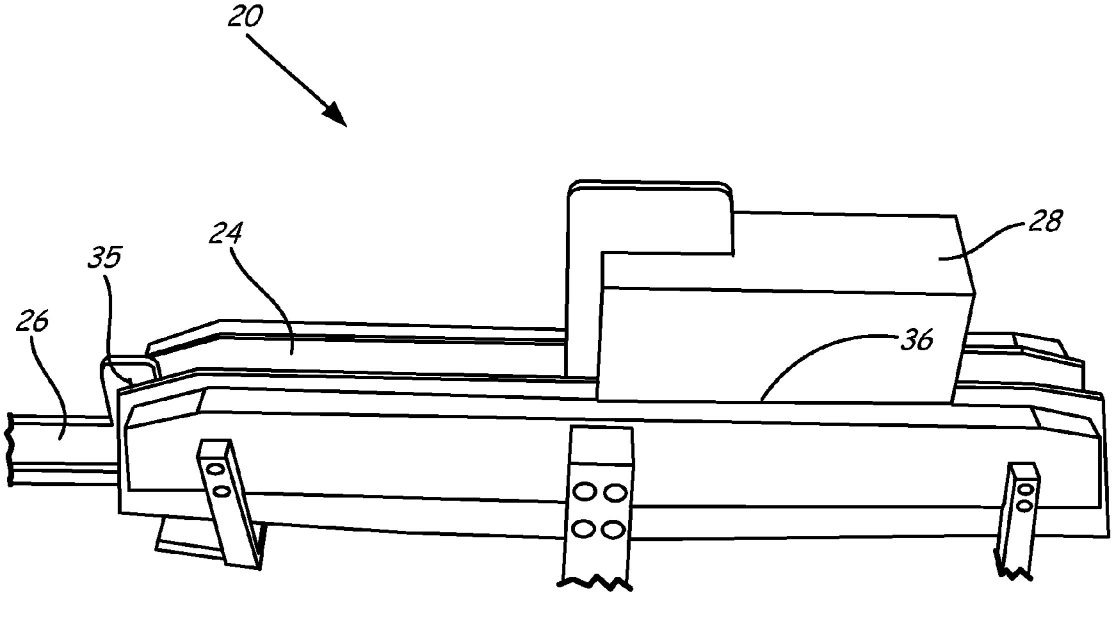
FIG. 8F is a perspective view of a plate slid into a U-shaped component.

Once flexible component 22 has been coated with adhesive, plate 26 is coupled to a block 28 (step 56). FIG. 8D is a perspective view of plate 26 coupled to block 28. Block 28 may have slit 38 which receives base 30 of plate 26 thereby coupling plate 26 to block 28. Once coupled, block 28 is positioned on top of an open end of U-shaped component (step 58). FIG. 8E is a perspective view of block 28 positioned on top of U-shaped component 24. Block 28 may have lip 36 for positioning on top of U-shaped component 24. U-shaped component 24 may comprise, but is not limited to, a fan inlet shroud fairing. Once block 28 is positioned on top of U-shaped component 24, plate 26 is slid into U-shaped component 24 (step 60) as indicated by arrow A. When sliding into U-shaped component 24, plate 26 guides flexible component 22 into a predetermined position for installation. FIG. 8F is a perspective view of plate 26 after sliding into U-shaped component 24. Method 48 teaches how to insert flexible component 22 into U-shaped component 24 using installation tool 20.

Figure 9A:
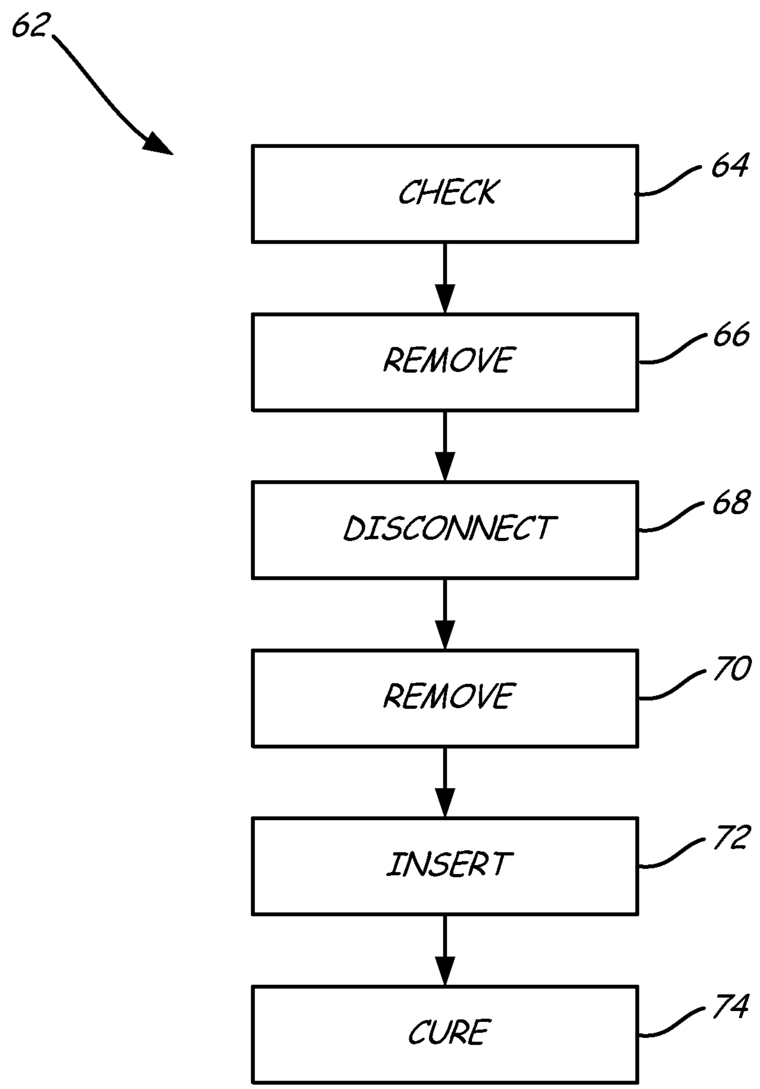
FIG. 9A is a block diagram of an additional method for using an installation tool.

FIG. 9A is a block diagram of method 62 for using an installation tool to complete installation of a flexible component in a U-shaped component. Method 62 includes: checking a horizontal alignment of the flexible component with respect to the U-shaped component (step 64), removing the block from the plate (step 66), disconnecting the flexible assembly from the plate (step 68), removing the plate (step 70), inserting a mandrel into the U-shaped component (step 72), and curing the adhesive (step 74). Method 62 may be used in conjunction with method 48, but is not dependent on method 48. FIGS. 9B-9F illustrate the steps outlined in FIG. 9A.

Figure 9B:
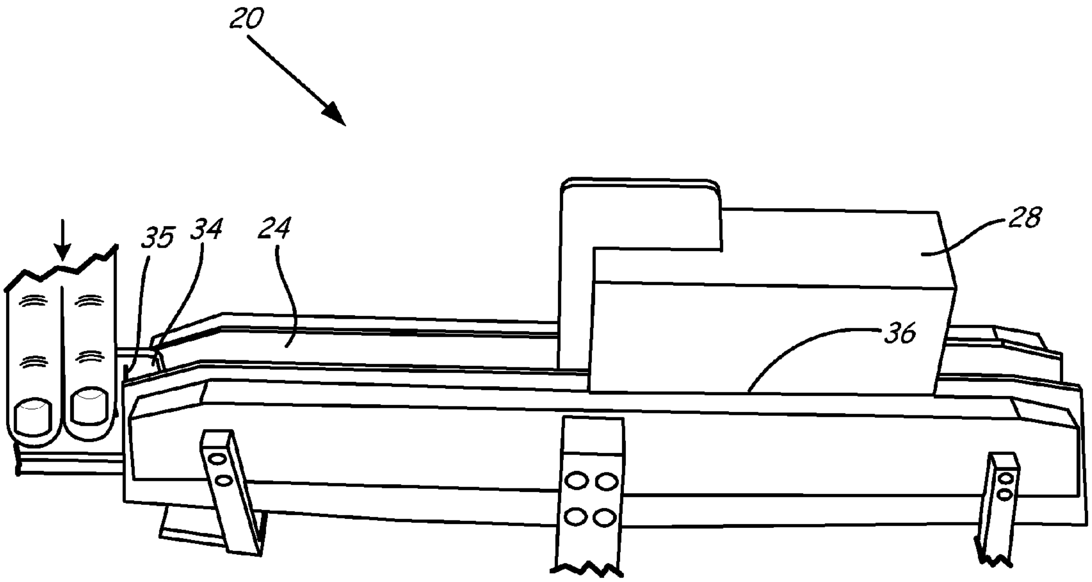
FIG. 9B is a perspective view an indicator for checking the horizontal alignment of a flexible component with respect to a U-shaped component.

When plate 26 is slid inside of U-shaped component 24, it assumes a vertical position determined by block 28. It may, however, be desirable to check the horizontal alignment of plate 26 (carrying flexible component 22) with respect to U-shaped component 24 (step 64). FIG. 9B is a perspective view of indicator 35 on side arm 34 being used to check the horizontal alignment of plate 26 with respect to U-shaped component 24. If alignment is satisfactory, disassembly of the tool may begin.

Figure 9C:
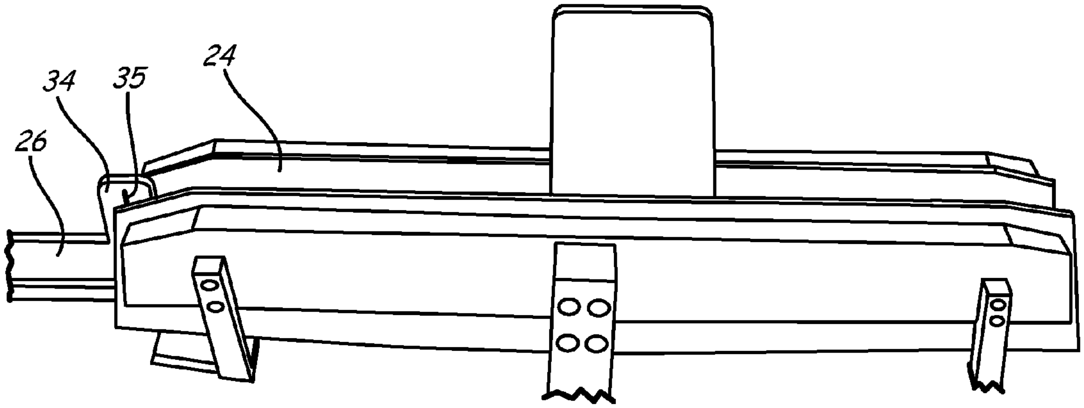
FIG. 9C is a perspective view of U-shaped component with a block removed.
Figure 9D:
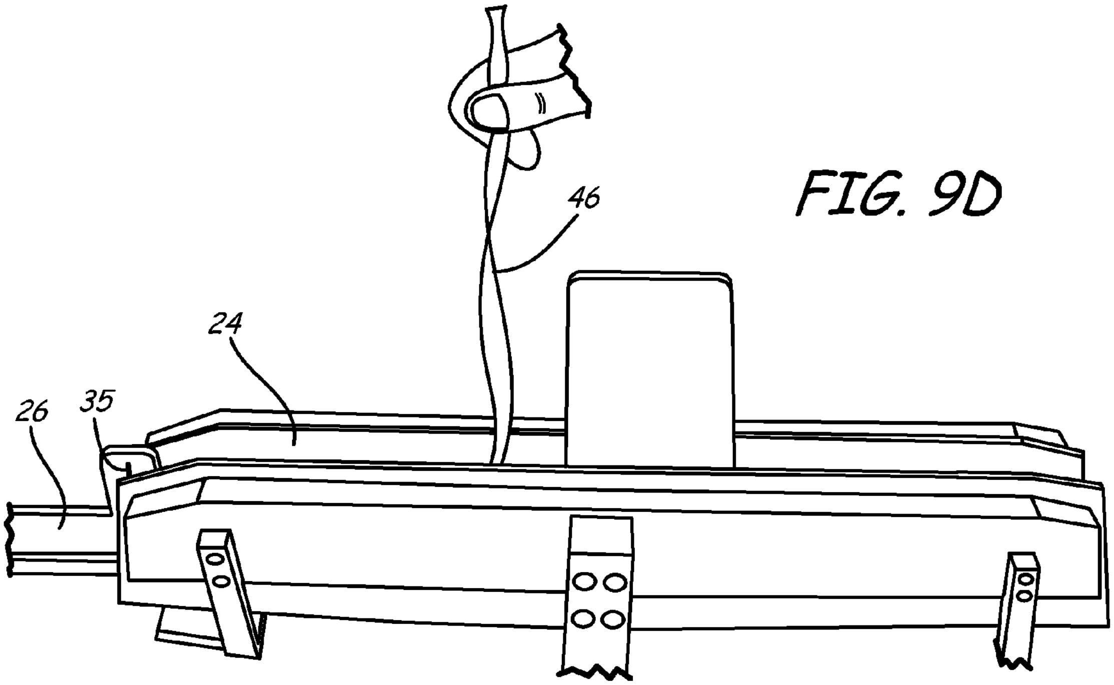
FIG. 9D is a perspective view of an insert being disconnected from a plate.
Figure 9E:
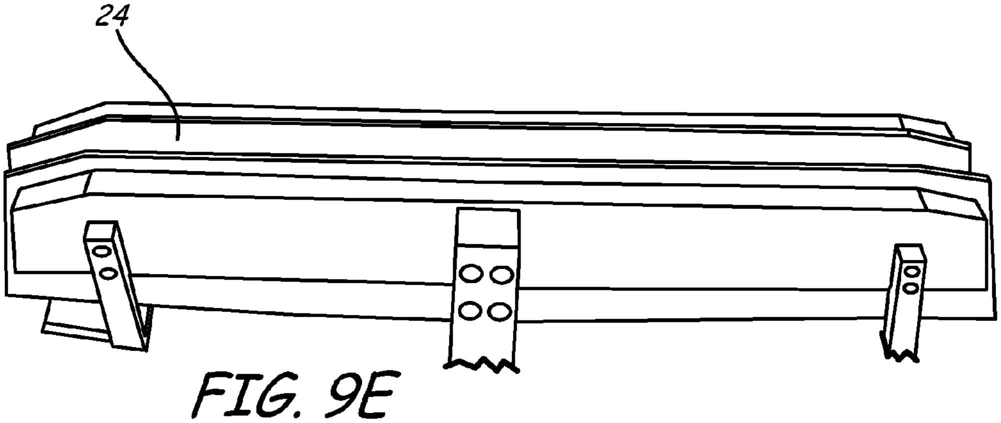
FIG. 9E is a perspective view of U-shaped component with a plate removed.
Figure 9F:
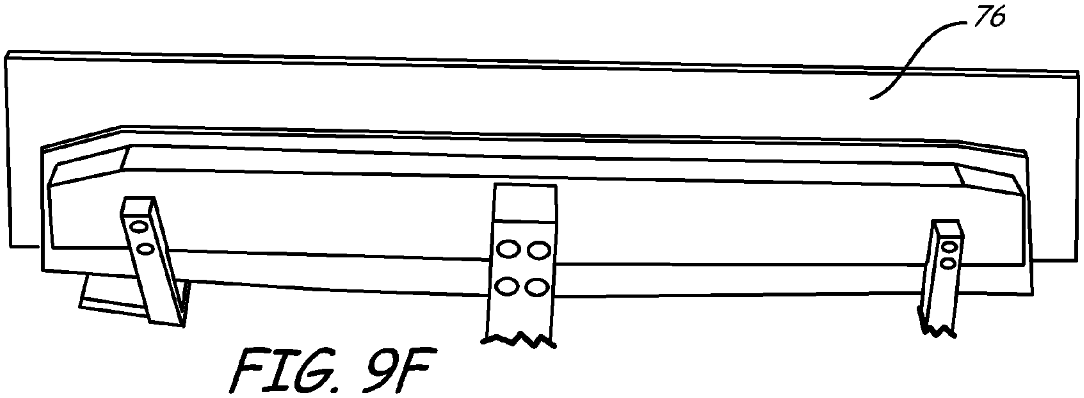
FIG. 9F is a perspective view of a mandrel inserted into a U-shaped component.

Installation tool 20 may be disassembled while leaving flexible component 22 in its inserted location within U-shaped component 24. Block 28 may be removed from plate 26 (step 66), by decoupling the coupling mechanism which held block 28 and plate 26 together. FIG. 9C is a perspective view of U-shaped component 24 with block 28 removed. After block 28 is removed, the flexible assembly (insert 40 and flexible component 22) may be disconnected from support plate 26 (step 68). FIG. 9D is a perspective view of the flexible assembly being disconnected from plate 26. If tape 46 was used to attach the flexible assembly to plate 26, tape 46 may be removed. After the flexible assembly is disconnected from plate 26, plate 26 may be removed from U-shaped component 24 (step 70). FIG. 9E is a perspective view of U-shaped component 24 with plate 26 removed. Once disassembly of installation tool 20 is complete, flexible component 22 is fixed in its inserted location within U-shaped component 24. If desired, mandrel 76 may be inserted into U-shaped component 24 (step 72). FIG. 9F is a perspective view of mandrel 76 inserted into U-shaped component 24. After insertion of mandrel 76 into U-shaped component 24, the adhesive may be cured (step 74) to assure flexible component 22 does not move from its intended location. Curing the adhesive may include applying pressure and/or heat to the adhesive. Method 62 teaches how to adhere a flexible component to an inner surface of the U-shaped component.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method comprising:
forming a flexible assembly that includes a flexible component;
attaching the flexible assembly to a plate;
coating the flexible component with an adhesive;
coupling the plate to a block;
positioning the block on top of an open end of a U-shaped component; and
sliding the plate into the U-shaped component, wherein the plate guides the flexible component into a position for installation;
wherein the flexible component is a flex circuit and the U-shaped component is a fan inlet shroud fairing.

2. The method of claim 1, further comprising:
covering a remainder of the plate with a material; and
removing the material covering the remainder of the plate.

3. The method of claim 1, further comprising:
checking horizontal alignment of the flexible component with respect to the U-shaped component.

4. The method of claim 1, further comprising:
removing the block from the plate;
removing the plate; and
curing the adhesive, to adhere the flexible component to an inner surface of the U-shaped component.

5. The method of claim 4, further comprising:
inserting a mandrel into the U-shaped component after removing the plate.

6. The method of claim 4, wherein curing the adhesive includes at least one of applying pressure and heat to the adhesive.

7. A method comprising:
forming a flexible assembly that includes a flex circuit;
attaching the flexible assembly to a plate;
coating the flex circuit with an adhesive;
coupling the plate to a block;
positioning the block on top of an open end of a fan inlet shroud fairing; and
sliding the plate into the fan inlet shroud fairing, wherein the plate guides the flex circuit into a position for installation.

8. The method of claim 7, further comprising:
placing the fan inlet shroud fairing in a cradle before positioning the block on top of the open end of the fan inlet shroud fairing.

9. The method of claim 8 further comprising:
removing the fan inlet shroud fairing from the cradle after the flex circuit is positioned for installation within the fan inlet shroud fairing.

10. The method of claim 1, wherein the plate comprises a base and an arm extending from one end of the base to form an L shape, the plate being substantially flat for supporting the flexible component.

11. The method of claim 10, wherein the plate further comprises:

a side arm extending perpendicularly from a central location of the arm, the side arm for supporting the flexible component.

12. The method of claim 11, wherein the plate further comprises:

an indicator located on the side arm, the indicator for aligning the flexible component in the U-shaped component.

13. The method of claim 10, wherein the plate is aluminum.

14. The method of claim 1, wherein the block is defined in part by a first side, a second side, and a first end extending between the first side and the second side, the block further including a slit and a lip, the slit extending into the first end, the slit for receiving a base of the plate into the first end of the block, the lip protruding from the first side and the second side, the lip for resting on top of a U-shaped component such that the arm depends downwardly from the block into an opening of the U-shaped component to place the flexible component within the U- shaped component.

15. The method of claim 1, further comprising:

positioning the U-shaped component in a cradle having a first side and a second side, the second side extending parallel to the first side, the first side and the second side of the cradle for directly supporting a first side and a second side of the U-shaped component, respectively, during installation of the flexible component in the U-shaped component.

16. The method of claim 1, further comprising:

inserting at least one insert inside of the flexible component, the insert having an edge extending beyond the flexible component and for attachment to an arm of the plate.

17. The method of claim 7, wherein the plate comprises a base and an arm extending from one end of the base to form an L shape, the plate being substantially flat for supporting the flex circuit.

18. The method of claim 17, wherein the plate further comprises:

a side arm extending perpendicularly from a central location of the arm, the side arm for supporting the flex circuit.

19. The method of claim 18, wherein the plate further comprises:

an indicator located on the side arm the indicator for aligning the flex circuit in the fan inlet shroud fairing.

20. The method of claim 7, wherein the block is defined in part by a first side, a second side, and a first end extending between the first side and the second side, the block further including a slit and a lip, the slit extending into the first end, the slit for receiving a base of the plate into the first end of the block, the lip protruding from the first side and the second side, the lip for resting on top of the fan inlet shroud fairing such that the arm depends downwardly from the block into an opening of the fan inlet shroud fairing to place the flex circuit within the fan inlet shroud fairing.

* * * * *